(12) United States Patent
Xie et al.

(10) Patent No.: US 10,117,169 B2
(45) Date of Patent: Oct. 30, 2018

(54) METHOD AND SYSTEM FOR AUTOMATICALLY ADAPTING TO WI-FI NETWORK WITH HIDDEN SSID

(71) Applicant: ZHEJIANG SHENGHUI LIGHTING CO., LTD, Jiaxing (CN)

(72) Inventors: Shengli Xie, Jiaxing (CN); Xiaoping Zhu, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 198 days.

(21) Appl. No.: 15/026,299

(22) PCT Filed: May 8, 2015

(86) PCT No.: PCT/CN2015/078598
§ 371 (c)(1),
(2) Date: Mar. 31, 2016

(87) PCT Pub. No.: WO2016/041363
PCT Pub. Date: Mar. 24, 2016

(65) Prior Publication Data
US 2016/0249287 A1 Aug. 25, 2016

(30) Foreign Application Priority Data
Sep. 15, 2014 (CN) .......................... 2014 1 0469047

(51) Int. Cl.
*H04W 48/20* (2009.01)
*H04L 9/06* (2006.01)
(Continued)

(52) U.S. Cl.
CPC ........... *H04W 48/20* (2013.01); *H04L 9/0631* (2013.01); *H04W 12/08* (2013.01); *H04W 12/10* (2013.01);
(Continued)

(58) Field of Classification Search
CPC ..... H04W 48/20; H04W 24/04; H04W 76/02; H04W 40/12; H04W 12/10; H04W 48/16; H04W 48/18; H04L 9/06
See application file for complete search history.

(56) References Cited

U.S. PATENT DOCUMENTS 8,238,889 B1 * 8/2012 Vu ........................ H04W 48/18
370/328
2004/0248557 A1 * 12/2004 Muratsu .............. H04L 12/4641
455/411

(Continued)

FOREIGN PATENT DOCUMENTS

| CN | 101141259 A | 3/2008 |
|---|---|---|
| CN | 102938886 A | 2/2013 |
| CN | 104302015 A | 1/2015 |

OTHER PUBLICATIONS

The World Intellectual Property Organization (WIPO) International Search Report for PCT/CN2015/078598 dated Aug. 11, 2015.

*Primary Examiner* — Anez C Ebrahim
(74) *Attorney, Agent, or Firm* — Anova Law Group, PLLC (57) ABSTRACT

A method for automatically adapting to a Wi-Fi network with hidden service set identifier (SSID) is provided. The method includes a wireless access point (AP) hiding an SSID of the wireless AP and receiving a probe request frame containing request information for automatically adapting to a Wi-Fi network of the wireless AP within coverage of the wireless AP. The method also includes the wireless AP determining whether the probe request frame contains the request information for automatically adapting to the Wi-Fi network of the wireless AP and the wireless AP sending a probe response frame when the probe request frame contains the request information for automatically adapting to the Wi-Fi network of the wireless AP. Further, the method
(Continued)

includes the wireless AP receiving a connection request sent by at least one Wi-Fi terminal, such that the at least one Wi-Fi terminal is connected to the Wi-Fi network wirelessly.

19 Claims, 3 Drawing Sheets

(51) Int. Cl.
    *H04W 12/10*     (2009.01)
    *H04W 48/16*     (2009.01)
    *H04W 48/18*     (2009.01)
    *H04W 12/08*     (2009.01)
    *G08B 5/38*     (2006.01)
    *H04W 84/12*     (2009.01)

(52) U.S. Cl.
    CPC ............ *H04W 48/16* (2013.01); *H04W 48/18* (2013.01); *G08B 5/38* (2013.01); *H04W 84/12* (2013.01)

(56) References Cited

U.S. PATENT DOCUMENTS

| | | | |
|---|---|---|---|
| 2005/0195781 A1* | 9/2005 | Ikeda | H04W 48/12 370/338 |
| 2009/0054033 A1* | 2/2009 | Pratt, Jr. | G01D 21/00 455/410 |
| 2013/0103807 A1 | 4/2013 | Couto et al. | |

* cited by examiner

METHOD AND SYSTEM FOR AUTOMATICALLY ADAPTING TO WI-FI NETWORK WITH HIDDEN SSID

CROSS-REFERENCES TO RELATED APPLICATIONS

This application is a national stage application under 35 USC § 371(c) of PCT Application No. PCT/CN2015/078598, entitled "Method and System for Automatically Adapting to WI-FI Network with Hidden SSID" filed on May 8, 2015, which claims priority to Chinese Patent Application No. 201410469047.2, filed on Sep. 15, 2014. The entire disclosure and contents of the above applications are hereby incorporated by reference herein.

FIELD OF THE INVENTION

The present invention relates generally to the field of wireless communication technologies and, more particularly, to methods and systems for automatically adapting to a Wireless Fidelity (Wi-Fi) network with hidden Service Set Identifier (SSID).

BACKGROUND

With the rapid development of wireless network technologies, wireless networks have broadly expanded their coverage. With the common use of wireless networks, a wireless network security problem has become more obvious. Currently, in a wireless network, communication between a terminal and a wired local area network (WLAN) is implemented through a wireless access point (AP). The wireless AP provides a bridge between a wireless workstation and the WLAN. Within the coverage of the wireless AP, the terminal (including mobile terminal and fixed terminal) detects a received wireless signal and obtains Service Set Identifier (SSID) of the wireless AP, such that the terminal is connected to the network through the wireless AP.

Wireless Fidelity (Wi-Fi) technology is a technology that allows personal computers (PCs) and smart terminals (e.g., tablet computers, smartphones, etc.) to connect together wirelessly. Almost all smartphones, tablet computers and laptops support Wi-Fi Internet access technology. The Wi-Fi technology is may be the most widely used wireless network transmission technology. Wi-Fi network are based on the Institute of Electrical and Electronics Engineers (IEEE) 802.11 standards.

In general, a basic Wi-Fi network AP can broadcast its network information (e.g., SSID). If a Wi-Fi terminal searches for a Wi-Fi network, the Wi-Fi network AP sends out response information and informs the Wi-Fi terminal of its SSID. Some Wi-Fi network APs may hide their own network information based on security or other considerations. In this case, only the terminal that knows the SSID information of one Wi-Fi network can connect to this Wi-Fi network.

With the rapid development of network technologies, a lot of smart home systems, Internet of things (IOT) systems and sensor network systems use the Wi-Fi communication technology. The number of Wi-Fi networks in living and working environments has increased tremendously. The Wi-Fi networks are often deployed for the specific purposes stated above, such as connecting various appliances. There is no big different between the private Wi-Fi networks and the Wi-Fi broadband router for connecting to the Internet. If a user uses a regular Wi-Fi terminal (e.g., a mobile phone) to connect to the Wi-Fi network, the Wi-Fi terminal may mistakenly connect to the private Wi-Fi network. However, the original intention of the user is to connect to the Internet. This may result in inconvenience for the user. If the network information of the private Wi-Fi network is set to be hidden when the private Wi-Fi network is deployed, a recently joined Wi-Fi terminal may not find the correct Wi-Fi network.

Therefore, it is necessary to provide a Wi-Fi network connection method and system with characteristics of automatic adaptation, concealment and connection security.

The disclosed methods and systems are directed to solve one or more problems set forth above and other problems.

BRIEF SUMMARY OF THE DISCLOSURE

One aspect of the present disclosure includes a method for automatically adapting to a Wi-Fi network with hidden service set identifier (SSID). The method includes a wireless access point (AP) hiding an SSID of the wireless AP and the wireless AP receiving a probe request frame containing request information for automatically adapting to a Wi-Fi network of the wireless AP within coverage of the wireless AP. The method also includes the wireless AP determining whether the probe request frame contains the request information for automatically adapting to the Wi-Fi network of the wireless AP and the wireless AP sending a probe response frame corresponding to the probe request frame when the probe request frame contains the request information for automatically adapting to the Wi-Fi network of the wireless AP. Further, the method includes the wireless AP receiving a connection request sent by at least one Wi-Fi terminal, such that the at least one Wi-Fi terminal is connected to the Wi-Fi network wirelessly.

Another aspect of the present disclosure includes a system for automatically adapting to a Wi-Fi network with hidden service set identifier (SSID). The system includes a wireless access point (AP) configured to process a probe request frame sent from at least one Wi-Fi terminal, wherein the wireless AP further includes a configuration management module configured to hide an SSID of the wireless AP; a receiving module configured to receive the probe request frame sent by the at least one Wi-Fi terminal and receive a connection request from the at least one Wi-Fi terminal; a determination module configured to determine whether the probe request frame contains request information for automatically adapting to a Wi-Fi network of the wireless AP; and a sending module configured to send a probe response frame after it is determined that the probe request frame contains the request information for automatically adapting to the Wi-Fi network of the wireless AP. The system also includes the at least one Wi-Fi terminal configured to send the probe request frame to the wireless AP, receive the probe response frame sent from the wireless AP, and send the connection request to the wireless AP, such that the at least one Wi-Fi terminal is connected to the wireless AP wirelessly.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

According to IEEE 802.11 standards, a Wi-Fi terminal may search surrounding Wi-Fi networks through two methods. The first method is to listen for beacon frames coming from a Wi-Fi access point (AP), where AP or Wi-Fi AP is a wireless access point. Beacon frame is one of the management frames in IEEE 802.11 based WLANs. The beacon frame contains all the information about the Wi-Fi network. Beacon frames are transmitted periodically by the Wi-Fi AP to announce the presence of the Wi-Fi network. The Wi-Fi AP which does not hide the Wi-Fi network information may periodically broadcast its own network information through broadcasting the beacon frame, such that the surrounding Wi-Fi terminals that are interested in this network can be connected to the Wi-Fi network. The network information of the Wi-Fi AP is the Service Set Identifier (SSID), Basic Service Set Identifier (BSSID), or Extended Service Set Identifier (ESSID). The SSID is the only ID code of the AP. It is used as a unique identifier for a wireless network by a user. The second method is that the Wi-Fi terminal actively sends out a Wi-Fi probe request frame. The Wi-Fi AP which does not hide the network information sends out a probe response frame in response to the received probe request frame. Therefore, the Wi-Fi terminal obtains the Wi-Fi network information. The probe request frame and the probe response frame are standard management frames defined by the IEEE 802.11 standards.

Figure 1:
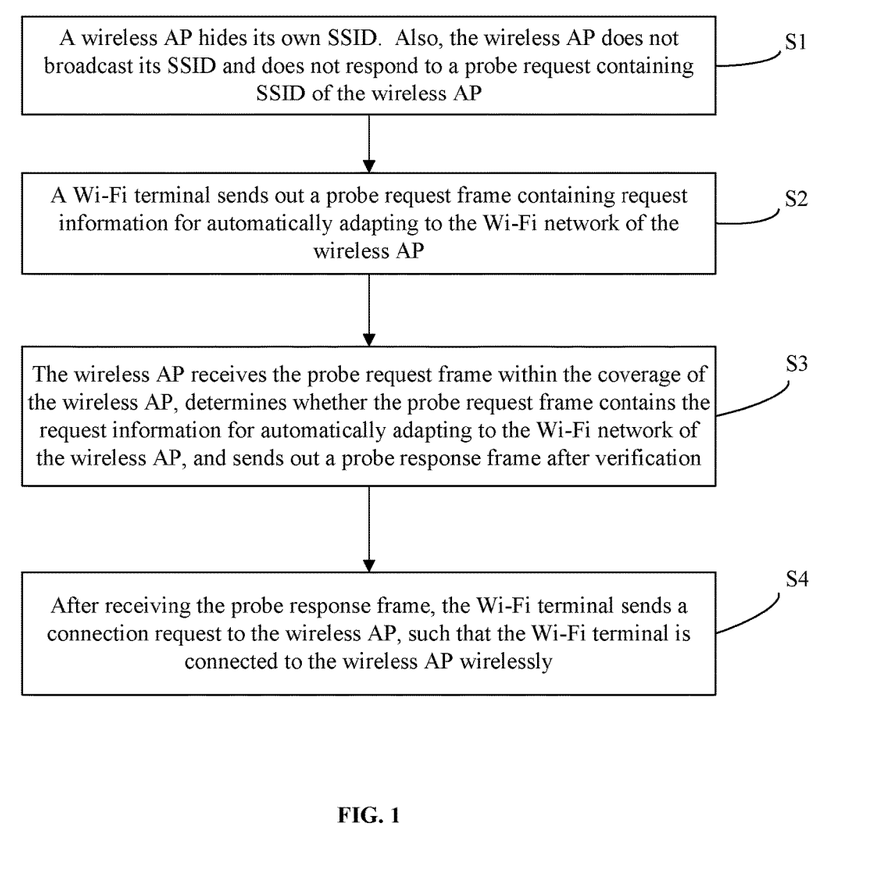
FIG. 1 illustrates a flow chart of an exemplary process for automatically adapting to a Wi-Fi network with hidden SSID consistent with the disclosed embodiments.

In the disclosure, the Wi-Fi AP is set to hide the network information. Because the two Wi-Fi network probe methods stated above cannot be used, the Wi-Fi terminal cannot know the presence of the Wi-Fi network. FIG. 1 illustrates a flow chart of an exemplary process for automatically adapting to a Wi-Fi network with hidden SSID consistent with the disclosed embodiments. As shown in FIG. 1, the process may include the following steps.

Step S1: a wireless AP hides its own SSID. Also, the wireless AP does not broadcast its SSID and does not respond to a probe request containing SSID of this wireless AP.

Step S2: a Wi-Fi terminal sends out a probe request frame containing request information for automatically adapting to the Wi-Fi network of the wireless AP.

In the method for automatically adapting to the Wi-Fi network, after receiving the probe request frame from the Wi-Fi terminal, the Wi-Fi AP processes a vendor specific field possibly contained in the probe request frame, where the vendor specific field is a custom field defined by a user. Based on the vendor specific field, whether the Wi-Fi terminal is allowed to use service provided by this Wi-Fi network is determined. If the probe request frame is sent by a Wi-Fi terminal that can automatically adapt to this Wi-Fi network, the probe request frame contains one or more particular vendor specific fields.

In Step S2, request information of the Wi-Fi terminal for automatically adapting to the Wi-Fi network is contained in the vendor specific field of the probe request frame. The vendor specific field may contain an Organizationally Unique Identifier (OUI), request information for automatically adapting to the Wi-Fi network, and a check code. The Organizationally Unique Identifier (OUI) is a 3-byte number that uniquely identifies a vendor, manufacturer, or other organizations. The OUI is assigned by IEEE. The request information for automatically adapting to the Wi-Fi network is used to indicate network information of the wireless AP that the Wi-Fi terminal wants to join. The request information for automatically adapting to the Wi-Fi network may include, but is not limited to, the following information: service or type of service to be used, requirement for using the Wi-Fi network, information (e.g., type or model) of the Wi-Fi network device to be used, where the specific field name, format and design are different for different devices. Specifically, the request information for automatically adapting to the Wi-Fi network may include an identifier for automatically adapting to the Wi-Fi network, a demand service identifier, a type or model of the Wi-Fi terminal, fields (e.g., function or capability) that can be provided by the Wi-Fi terminal. The check code is abstract of other fields. The check code is used to check information integrity for the vendor specific field.

Step S3: the wireless AP receives the probe request frame within the coverage of the wireless AP, determines whether the probe request frame contains the request information for automatically adapting to the Wi-Fi network of the wireless AP, and sends out a probe response frame after verification. The wireless AP does not respond to the probe request frame without the request information for automatically adapting to the Wi-Fi network of the wireless AP.

In Step S3, through checking whether the vendor specific field in the probe request frame contains the request information for automatically adapting to the Wi-Fi network of this wireless AP, the wireless AP determines whether the Wi-Fi terminal that sends the probe request frame is allowed to use the service provided by this wireless AP.

Specifically, whether the check code field is correct is calculated and determined. If the check code field were not correct, the corresponding probe request frame would not be used. If the check code were correct, the field containing the request information for automatically adapting to the Wi-Fi network would be checked. If the field containing the request information for automatically adapting to the Wi-Fi network meets the requirements, the wireless AP may send a probe response frame to the Wi-Fi terminal, such that the Wi-Fi terminal can find and be connected to the Wi-Fi network.

Step S4: after receiving the probe response frame, the Wi-Fi terminal sends a connection request to the wireless AP, such that the Wi-Fi terminal is connected to the wireless AP wirelessly.

The probe response frame sent by the wireless AP also contains a vendor specific field. The definition of the vendor specific field contained in the probe response frame is different from the vendor specific field contained in the probe request frame. The vendor specific field contained in the probe response frame may contain confirmation information for automatically adapting to the Wi-Fi network and connection information of the wireless AP. Specifically, the probe response frame may include the following information:

1. an Organizationally Unique Identifier (OUI).
2. confirmation information for automatically adapting to the Wi-Fi network which includes service or type of service provided by the Wi-Fi network, a type or model of the Wi-Fi network device, special functions of the Wi-Fi network, remaining load or available capacity of the Wi-Fi network. For example, the confirmation information for automatically adapting to the Wi-Fi network may include an identifier for automatically adapting to the Wi-Fi network, a demand service identifier, a type or model of the wireless AP, and functions that can be provided by the wireless AP. It should be understood that the specific field name, format and design can be different according to different devices.
3. connection information of the wireless AP which includes an SSID, a safe mode, an encryption method, a key and a key set. The connection information is encrypted using Advanced Encryption Standard-128 (AES-128). It can also be encrypted using other methods. Therefore, the connection information of the wireless AP is cipher text.
4. a check code which is abstract of the various fields stated above. The check code is used to check information integrity for the vendor specific field.

In Step S4, after the Wi-Fi terminal receives the probe response frame sent by the wireless AP, the Wi-Fi terminal analyzes and processes the probe response frame. Based on contents of the probe response frame, the Wi-Fi terminal determines whether to join the Wi-Fi network. The analyzing and processing process are described in the following.

First, calculation is performed and whether the check code field is correct is determined. If the check code field is not correct, a connection request is not sent or a probe request frame is re-sent. Then, the OUI field is checked. Through the OUI field, a list of manufactures that are supported by this Wi-Fi terminal can be obtained. Therefore, whether the Wi-Fi terminal can be connected to the Wi-Fi network and use the corresponding services is determined. However, the manufactures may be not limited and the OUI field may be ignored. Further, the confirmation information for automatically adapting to the Wi-Fi network is checked. When the confirmation information is matched, the Wi-Fi terminal decrypts the connection information field and the Wi-Fi terminal is connected to the Wi-Fi network using corresponding information of the field.

Figure 2:
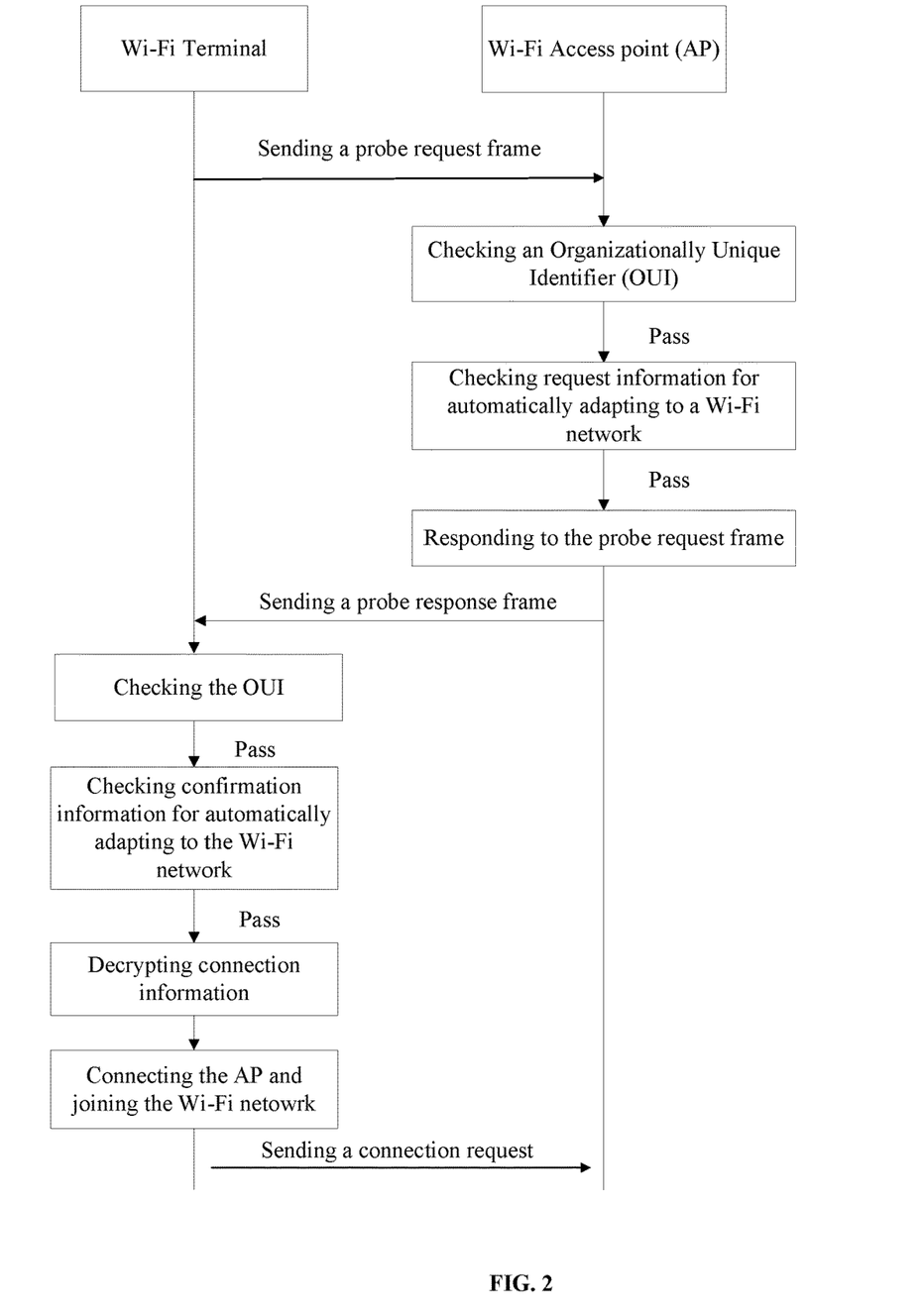
FIG. 2 illustrates a flow chart of another exemplary process for automatically adapting to a Wi-Fi network with hidden SSID consistent with the disclosed embodiments.

FIG. 2 illustrates a flow chart of another exemplary process for automatically adapting to a Wi-Fi network with hidden SSID consistent with the disclosed embodiments. As shown in FIG. 2, the process may include the following steps.

At the beginning, a Wi-Fi terminal sends a probe request frame to a Wi-Fi AP, where the probe request frame contains an OUI, request information for automatically adapting to a Wi-Fi network of the Wi-Fi AP, and a check code. After receiving the probe request frame, the Wi-Fi AP checks the OUI. Then, the Wi-Fi AP checks the request information for automatically adapting to the Wi-Fi network of the Wi-Fi AP. When it is determined that the OUI and the request information for automatically adapting to the Wi-Fi network of the Wi-Fi AP meet requirements, the Wi-Fi AP responds to the probe request frame. The Wi-Fi AP sends a probe response frame to the Wi-Fi terminal, where the probe response frame contains an OUI, confirmation information for automatically adapting to the Wi-Fi network, connection information of the wireless AP and a check code. After the Wi-Fi terminal receives the probe response frame, the Wi-Fi terminal checks the OUI and the confirmation information for automatically adapting to the Wi-Fi network, respectively. When it is determined that the OUI and the confirmation information for automatically adapting to the Wi-Fi network meet the requirements, the Wi-Fi terminal decrypts the connection information. At last, the Wi-Fi terminal sends a connection request to the Wi-Fi AP, such that the Wi-Fi terminal may be connected to the Wi-Fi AP.

Figure 3:
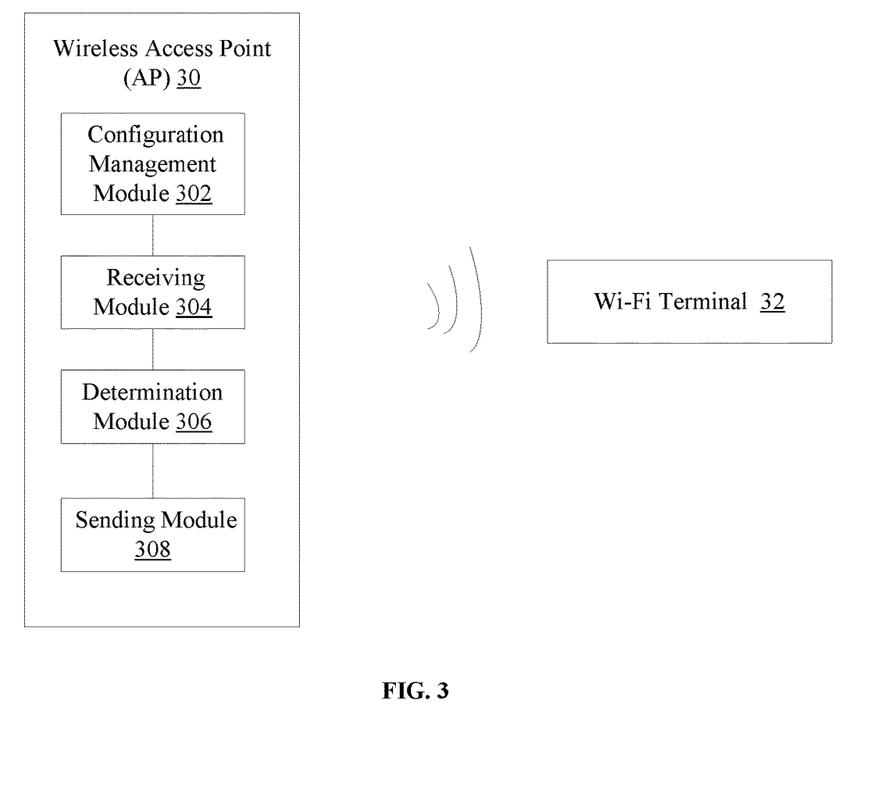
FIG. 3 illustrates a structure schematic diagram of an exemplary system for automatically adapting to a Wi-Fi network with hidden SSID consistent with the disclosed embodiments.

A system for automatically adapting to a Wi-Fi network with hidden SSID is also provided in this disclosure. The system includes a wireless AP and at least one Wi-Fi terminal. The wireless AP hides its own SSID. Also, the wireless AP does not broadcast its SSID. The Wi-Fi terminal sends request information for automatically adapting to the Wi-Fi network of the wireless AP. Within the coverage of the wireless AP, the wireless AP detects and receives a probe request frame, determines whether the probe request frame contains the request information for automatically adapting to the Wi-Fi network of the wireless AP. When the wireless AP confirms that the probe request frame contains the request information for automatically adapting to the Wi-Fi network of the wireless AP, the wireless AP sends a probe response frame to the corresponding Wi-Fi terminal. The wireless AP does not respond to the probe request frame without the request information for automatically adapting to the Wi-Fi network of the wireless AP. The Wi-Fi terminal which receives the probe response frame sends a connection request to the wireless AP, such that the Wi-Fi terminal is connected to the wireless AP wirelessly. FIG. 3 illustrates a structure schematic diagram of an exemplary system for automatically adapting to a Wi-Fi network with hidden SSID consistent with the disclosed embodiments.

As shown in FIG. 3, the system may include a wireless AP 30 and at least one Wi-Fi terminal 32. The wireless AP may further include a configuration management module 302, a receiving module 304, a determination module 306, and a sending module 308. Certain modules may be omitted and other modules may be included.

The configuration management module 302 may be configured to hide an SSID of the wireless AP.

The receiving module 304 may be configured to receive a probe request frame containing request information for automatically adapting to a Wi-Fi network of the wireless AP within coverage of the wireless AP.

The determination module 306 may be configured to determine whether the probe request frame contains the request information for automatically adapting to the Wi-Fi network of the wireless AP.

The sending module 308 may be configured to, after it is determined that the probe request frame contains the request information for automatically adapting to the Wi-Fi network of the wireless AP, send a probe response frame to the Wi-Fi terminal.

The receiving module 304 may be further configured to receive a connection request sent by the Wi-Fi terminal, such that the Wi-Fi terminal is connected to the Wi-Fi network wirelessly.

In some embodiments consistent with the present disclosure, the wireless AP(s) or the Wi-Fi access point(s) may be integrated into an LED (light emitting diode) lighting device. One or more LED lighting devices may form an LED lighting system of connected LED lighting devices. Because the LED lighting devices may be distributed throughout a house or an office environment, a Wi-Fi terminal can communicate with one of the wireless APs embedded in the lighting device close to the W-Fi terminal and set up a Wi-Fi connection. Further, the control system for the LED lighting system may monitor the status of the AP(s) and control the lighting system to indicate various functions performed by one or more APs.

In one example, a wireless AP A1 is integrated into an LED lighting device L1. The lighting system may include multiple LED lighting devices. One or more LED lighting devices each may include an integrated AP. When a Wi-Fi terminal sends a probe request frame to the wireless AP A1, the LED lighting system may present a light signal (e.g., a flash, a light color change, a brightness change) at LED lighting device L1 or at another LED lighting device to indicate that the AP A1 has received the probe request frame. When the AP A1 verifies the information in the probe request frame, the LED lighting system may present a light signal (e.g., a flash, a light color change, a brightness change) at LED lighting device L1 or at another lighting device to indicate that the AP A1 is checking the probe request frame. When the AP A1 sends a probe response frame to the Wi-Fi terminal, the LED lighting system may again present a light signal (e.g., a flash, a light color change, a brightness change) at LED lighting device L1 or at another lighting device to indicate that the probe response frame is being sent. After the Wi-Fi terminal checks the confirmation information and sends the AP A1 a connection request, the LED lighting system may again present a light signal (e.g., a flash, a light color change, a brightness change) at L1 or at another lighting device to indicate that the connection request is received. Different light signals (different light colors, light flashes, etc.) may be used to indicate various functions being performed by the Wi-Fi terminal and the AP. The lighting system may also present the light signals at different locations (using different LED lighting devices) so that a user may monitor the network activities at the location (e.g., at L1) of the AP and/or at another location.

In some embodiments, an LED lighting device integrated with an AP may include a primary light source and a second light source. The primary light source may provide the lighting for the home/office environment as required of the LED lighting device. The secondary light source (e.g. a low power indicator light) may be used to indicate the status of the AP integrated with the lighting device. As the Wi-Fi terminal and the AP performs different functions (e.g., sending a probe request frame, sending a probe response frame, etc.), the secondary light source may change color or brightness level to indicate the status of the network probing/connection between the AP and the Wi-Fi terminal.

Further, although the methods and systems are disclosed for illustrative purposes, similar concept and approach can be applied to other Wireless Fidelity (Wi-Fi) network system. For example, the automatic adaptation Wi-Fi network may be applied to the following scenarios: for particular use; only a certain type or function of the Wi-Fi terminal can be allowed to join the Wi-Fi network; other Wi-Fi networks exist in the environment where this Wi-Fi network is deployed and end users of other Wi-Fi networks are not expected to see the information of this Wi-Fi network; when multiple Wi-Fi networks with different purposes coexist in one environment, the Wi-Fi terminals with different types or functions are expected to automatically connect to an appropriate Wi-Fi network.

Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Comparing with existing technologies, a wireless AP hides its own SSID. The wireless AP does not broadcast its SSID and does not respond to a probe request even if the request contains the SSID of this wireless AP. Therefore, the specific network containing the wireless AP is hidden. The confusion with the Wi-Fi broadband router can be avoided. At the same time, the specific Wi-Fi terminal that needs to connect to the specific Wi-Fi network can be connected to the specific Wi-Fi network smoothly. The characteristics of the method include automatic adaptation, concealment and connection security. The SSID network information of the wireless AP of the specific Wi-Fi network is hidden. So the common Wi-Fi terminals cannot detect the existence of the specific Wi-Fi network. Only when the probe request frame sent by the Wi-Fi terminal contains the request information for automatically adapting to the wireless AP, the wireless AP may respond to the probe request of the Wi-Fi terminal and sends a probe response frame containing confirmation information for automatically adapting to the Wi-Fi network to the Wi-Fi terminal. After the Wi-Fi terminal receives the probe response frame, the Wi-Fi terminal sends a connection request to the wireless AP, such that the Wi-Fi terminal can be connected to the Wi-Fi network of the wireless AP.

What is claimed is:

1. A method for automatically adapting to a Wireless Fidelity (Wi-Fi) network with hidden Service Set Identifier (SSID), comprising:
   hiding, a wireless access point (AP), an SSID of the wireless AP;
   receiving, by the wireless AP, a probe request frame containing request information for automatically adapting to a Wi-Fi network of the wireless AP within coverage of the wireless AP, the request information for automatically adapting to the Wi-Fi network including: an identifier for automatically adapting to the Wi-Fi network, a demand service identifier, a type and model of at least one Wi-Fi terminal, and functions provided by the at least one Wi-Fi terminal;
   determining, by the wireless AP, whether the probe request frame contains the request information for automatically adapting to the Wi-Fi network of the wireless AP;
   when the probe request frame contains the request information for automatically adapting to the Wi-Fi network of the wireless AP, sending, by the wireless AP, a probe response frame corresponding to the probe request frame;
   receiving, by the wireless AP, a connection request sent by the at least one Wi-Fi terminal; and
   connecting the at least one Wi-Fi terminal to the Wi-Fi network.

2. The method according to claim 1, wherein:
   the request information for automatically adapting to the Wi-Fi network is contained in a vendor specific field of the probe request frame; and
   the request information for automatically adapting to the Wi-Fi network is network information of the wireless AP that the Wi-Fi terminal requests to join.

3. The method according to claim 1, wherein:
a vendor specific field of the probe request frame contains a check code which is used to check information integrity for the vendor specific field of the probe request frame.

4. The method according to claim 1, wherein:
a vendor specific field of the probe request frame contains an Organizationally Unique Identifier (OUI).

5. The method according to claim 1, wherein:
the probe response frame contains confirmation information for automatically adapting to the Wi-Fi network and connection information of the wireless AP.

6. The method according to claim 5, wherein:
the confirmation information for automatically adapting to the Wi-Fi network and the connection information of the wireless AP are contained in a vendor specific field of the probe response frame.

7. The method according to claim 5, wherein:
the confirmation information for automatically adapting to the Wi-Fi network includes the identifier for automatically adapting to the Wi-Fi network, the demand service identifier, a type and model of the wireless AP, and functions provided by the wireless P.

8. The method according to claim 5, wherein:
the connection information includes the SSID, a safe mode, an encryption od, a key, and a key set.

9. The method according to claim 8, wherein:
the connection information is encrypted using Advanced Encryption Standard-128 (AES-128).

10. The method according to claim 5, wherein:
the Wi-Fi terminal processes the probe response frame containing the confirmation information for automatically adapting to the Wi-Fi network sent from the wireless AP;
based on contents of the probe response frame including a vendor specific field of the probe response frame, the Wi-Fi terminal determines whether to join the Wi-Fi network; and
when the Wi-Fi terminal determines to join the Wi-Fi network, a network connection process defined by the Institute of Electrical and Electronics Engineers (IEEE) 802.11 standards is started, such that the Wi-Fi terminal is connected to the Wi-Fi network.

11. The method according to claim 1, wherein:
a vendor specific field of the probe response frame contains a check code which is used to check information integrity for the vendor specific field of the probe response frame.

12. The method according to claim 1, wherein:
a vendor specific field of the probe response frame contains an OUI.

13. A system for automatically adapting to a Wireless Fidelity (Wi-Fi) network with hidden Service Set Identifier (SSID), comprising:
a wireless access point (AP) configured to:
hide an SSID of the wireless AP;
receive a probe request frame sent from at least one Wi-Fi terminal and receive a connection request from the at least one Wi-Fi terminal;
process the probe request frame sent from the at least one Wi-Fi terminal;
determine whether the probe request frame contains request information for automatically adapting to a Wi-Fi network of the wireless AP, the request information for automatically adapting to the Wi-Fi network including: an identifier for automatically adapting to the Wi-Fi network, a demand service identifier, a type and model of the at least one Wi-Fi terminal, and functions provided by the at least one Wi-Fi terminal; and
send a probe response frame after it is determined that the probe request frame contains the request information for automatically adapting to the Wi-Fi network of the wireless AP; and
the at least one Wi-Fi terminal configured to:
send the probe request frame to the wireless AP;
receive the probe response frame sent from the wireless AP; and
send the connection request to the wireless AP to connect the at least one Wi-Fi terminal to the wireless AP.

14. The system according to claim 13, wherein:
the request information for automatically adapting to the Wi-Fi network is contained in a vendor specific field of the probe request frame; and
the request information for automatically adapting to the Wi-Fi network is network information of the wireless AP that the Wi-Fi terminal requests to join.

15. The system according to claim 13, wherein:
the probe response frame contains confirmation information for automatically adapting to the Wi-Fi network and connection information of the wireless AP.

16. The system according to claim 15, wherein:
the confirmation information for automatically adapting to the Wi-Fi network and the connection information of the wireless AP are contained in a vendor specific field of the probe response frame.

17. The system according to claim 15, wherein:
the connection information includes the SSID, a safe mode, an encryption method, a key, and a key set.

18. The system according to claim 17, wherein:
the connection information is encrypted using Advanced Encryption Standard-128 (AES-128).

19. A method for automatically adapting to a Wireless Fidelity (Wi-Fi) network with hidden Service Set Identifier (SSID), comprising:
hiding, by a wireless access point (AP), an SSD of the wireless AP;
receiving, by the wireless AP, a probe request frame containing request information for automatically adapting to a Wi-Fi network of the wireless AP within coverage of the wireless AP, wherein the request information for automatically adapting to the Wi-Fi network includes an identifier for automatically adapting to the Wi-Fi network, a demand service identifier, a type and model of at least one Wi-Fi terminal, and functions provided by the at least one Wi-Fi terminal;
determining; by the wireless AP, whether the probe request frame contains the request information for automatically adapting to the Wi-Fi network of the wireless AP b checking a vendor specific field of the probe request frame;
when the probe request frame contains the request information for automatically adapting to the Wi-Fi network of the wireless AP, sending, by the wireless AP, a probe response frame corresponding to the probe request frame, wherein a vendor specific filed of the probe response frame contains the SSID;
receiving, by the wireless AP, a connection request sent by the at least one Wi-Fi terminal after the at least one terminal checks the vendor specific field of the probe response frame and determines to join the Wi-Fi network; and connecting the at least one Wi-Fi terminal to the Wi-Fi network.

\* \* \* \* \*